(12) United States Patent
Shin

(10) Patent No.: US 11,775,221 B2
(45) Date of Patent: Oct. 3, 2023

(54) MEMORY SYSTEM, MEMORY CONTROLLER, AND METHOD FOR OPERATING SAME

(71) Applicant: SK hynix Inc., Gyeonggi-do (KR)

(72) Inventor: Woong Sik Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/835,314

(22) Filed: Jun. 8, 2022

(65) Prior Publication Data

US 2022/0300212 A1    Sep. 22, 2022

Related U.S. Application Data

(63) Continuation of application No. 16/897,975, filed on Jun. 10, 2020, now Pat. No. 11,392,319.

(30) Foreign Application Priority Data

Dec. 6, 2019 (KR) .......................... 10-2019-0161380

(51) Int. Cl.
    *G06F 3/06* (2006.01)
(52) U.S. Cl.
    CPC .......... *G06F 3/0659* (2013.01); *G06F 3/0604* (2013.01); *G06F 3/0652* (2013.01); *G06F 3/0673* (2013.01)
(58) Field of Classification Search
    CPC ......... G06F 12/0246; G06F 2212/1028; G06F 2212/7201; G06F 2212/7203; G06F 2212/7207; G06F 2212/7208; G06F 3/0604; G06F 3/0625; G06F 3/0652; G06F 3/0659; G06F 3/0673; G06F 3/0679
    See application file for complete search history.

(56) References Cited

U.S. PATENT DOCUMENTS

2016/0162186 A1    6/2016  Kashyap et al.
2018/0188980 A1*   7/2018  Tai ...................... G06F 12/0246

FOREIGN PATENT DOCUMENTS

| KR | 10-0283115 B1   | 3/2001  |
|----|-----------------|---------|
| KR | 10-2016-0124990 A | 10/2016 |
| KR | 10-2017-0085638 A | 7/2017  |
| KR | 10-2019-0097712 A | 8/2019  |

* cited by examiner

*Primary Examiner* — Yong J Choe
(74) *Attorney, Agent, or Firm* — IP & T GROUP LLP

(57) ABSTRACT

Embodiments of the present disclosure relate to a memory system, a memory controller, and a method for operating the same. An operation of writing metadata in multiple memory dies in the memory device is started, and an erase operation is then performed, when the request for the erase operation exists, with regard to some of the multiple memory dies. Accordingly, the time taken to write metadata can be uniformly adjusted to the largest extent, and the magnitude of peak power consumed by the memory device can be minimized.

14 Claims, 14 Drawing Sheets

MEMORY SYSTEM, MEMORY CONTROLLER, AND METHOD FOR OPERATING SAME

CROSS REFERENCE TO RELATED APPLICATION

This application is a continuation of U.S. patent application Ser. No. 16/897,975 filed on Jun. 10, 2020, which claims priority from Korean Patent Application No. 10-2019-0161３$0, filed on Dec. 6, 2019, which is hereby incorporated by reference for all purposes as if fully set forth herein.

BACKGROUND OF THE INVENTION

1. Field of the Invention

Embodiments of the present disclosure relate to a memory system, a memory controller, and a method for operating the same.

2. Description of the Prior Art

A memory system. e.g., a storage device, stores data on the basis of a request of a host such as a computer, a mobile terminal (for example, a smartphone or a tablet), or other kinds of electronic devices. The memory system may include not only a device configured to store data in a magnetic disk, such as a hard disk drive (HDD), but also a device configured to store data in a nonvolatile memory, such as a solid state drive (SSD), a universal flash storage (UFS) device, and an embedded MMC (eMMC) device.

The memory system may further include a memory controller for controlling the memory device (for example, volatile memory/nonvolatile memory). The memory controller may receive a command input from the host and may perform or control operations for reading, writing, or erasing data in the memory device included in the memory system on the basis of the received command. In addition, the memory controller may drive firmware for performing a logical operation for performing or controlling such operations.

In addition, when writing data in the memory device, the memory controller may write not only user data, but also metadata regarding the user data in the memory device.

SUMMARY OF THE DISCLOSURE

Embodiments of the present disclosure may provide a memory system, a memory controller, and a method for operating the same, wherein the time taken to write metadata can be adjusted uniformly to the largest extent.

In addition, embodiments of the present disclosure may provide a memory system, a memory controller, and a method for operating the same, wherein the magnitude of peak power consumed by the memory device can be minimized.

In an aspect, embodiments of the present disclosure may provide a memory system including a memory device including multiple memory dies, and a memory controller configured to control the memory device.

The memory controller may start an operation of writing each of multiple metadata units in a first metadata unit group in a corresponding one of the multiple memory dies. The memory controller may confirm whether or not there exists a request for an erase operation with regard to at least one of the multiple memory dies after the start of the write operation.

The memory controller may perform the erase operation, when the request for the erase operation exists, with regard to memory dies in a first memory die group. The first memory die group may have a number of memory dies less than or equal to a first value, among the multiple memory dies.

The first value may be determined on the basis of i) peak power consumed when performing an operation of erasing a memory block in the multiple memory dies and ii) peak power that the memory device is able to consume.

The memory controller may start, after start of the erase operation with regard to at least one of the memory dies, an operation of writing each of multiple metadata units in a second metadata unit group in one of the multiple memory dies.

The memory controller may perform, after the start of the writing of each of multiple metadata units in the second metadata unit group in one of the multiple memory dies, the erase operation with regard to memory dies in a second memory die group. The second memory die group may have a number of memory dies less than or equal to a second value, among the multiple memory dies.

The memory dies in the first memory die group and the memory dies in the second memory die group may be different from each other.

The memory controller may determine, on the basis of a configured period, i) a time of the start of the operation of writing each of multiple metadata units in the first metadata unit group in one of the multiple memory dies and ii) a time of the start of the operation of writing each of multiple metadata units in the second metadata unit group in one of the multiple memory dies.

The memory controller may write user data in at least one of the multiple memory dies between i) a time after the start of the operation of writing each of multiple metadata units in the first metadata unit group in one of the multiple memory dies and ii) a time before the start of the erase operation with regard to the memory dies in the first memory die group.

In another aspect, embodiments of the present disclosure may provide a memory controller including: a memory interface configured to communicate with a memory device including multiple memory dies; and a control circuit configured to control the memory device.

The control circuit may start an operation of writing each of multiple metadata units in a first metadata unit group in a corresponding one of the multiple memory dies. The control circuit may confirm whether or not there exists a request for an erase operation with regard at least one of the multiple memory dies after the start of the write operation.

The control circuit may perform the erase operation, when the request for the erase operation exists, with regard to memory dies in a first memory die group. The first memory die group may have a number of memory dies less than or equal to a first value, among the multiple memory dies.

The first value may be determined on the basis of i) peak power consumed when performing an operation of erasing a memory block in the multiple memory dies and ii) peak power that the memory device is able to consume.

The control circuit may start, after start of the erase operation with regard to at least one of the memory dies, an operation of writing each of multiple metadata units in a second metadata unit group in one of the multiple memory dies.

The control circuit may perform, after the start of the writing of each of multiple metadata units in the second metadata unit group in one of the multiple memory dies, the erase operation with regard to memory dies in a second memory die group. The second memory die group may have a number of memory dies less than or equal to a second value, among the multiple memory dies.

The memory dies in the first memory die group and the memory dies in the second memory die group may be different from each other.

The control circuit may determine, on the basis of a configured period, i) a time of the start of the operation of writing each of multiple metadata units in the first metadata unit group in one of the multiple memory dies and ii) a time of the start of the operation of writing each of multiple metadata units in the second metadata unit group in one of the multiple memory dies.

The control circuit may write user data in at least one of the multiple memory dies between i) a time after the start of the operation of writing each of multiple metadata units in the first metadata unit group in one of the multiple memory dies and ii) a time before the start of the erase operation with regard to the memory dies in the first memory die group.

In another aspect, embodiments of the present disclosure may provide a method for operating a memory controller.

The method for operating a memory controller may include writing each of multiple metadata units in a first metadata unit group in a corresponding one of multiple memory dies.

The method for operating a memory controller may include performing an erase operation, when there exists a request for the erase operation with regard to at least one of the multiple memory dies, with regard to memory dies in a first memory die group. The first memory die group may have a number of memory dies less than or equal to a first value, among the multiple memory dies.

The method for operating a memory controller may further include writing, after start of the erase operation on at least one of memory blocks in the memory dies in the first memory die group, each of multiple metadata units in a second metadata unit group in one of the multiple memory dies.

The method for operating a memory controller may further include performing, after start of the writing of each of multiple metadata units in the second metadata unit group in one of the multiple memory dies, the erase operation with regard to a second memory die group. The second memory die group may have a number of memory dies less than or equal to a second value, among the multiple memory dies.

The memory dies in the first memory die group and the memory dies in the second memory die group may be different from each other.

In another aspect, embodiments of the present disclosure may provide an operating method of a controller including: controlling a memory device to start, when an erase operation is to be performed on one or more target blocks within memory dies, a write operation of writing metadata pieces into the memory dies, respectively.

The operating method of a controller may include controlling the memory device to alternately perform the write operation of writing each of the metadata pieces into a corresponding one of the memory dies and the erase operation on a target block within the corresponding memory die among the target blocks. The target blocks of the write operation and erase operation are different from each other.

According to embodiments of the present disclosure, the time taken to write metadata can be adjusted uniformly to the largest extent.

In addition, according to embodiments of the present disclosure, the magnitude of peak power consumed by the memory device can be minimized.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s).

Figure 1:
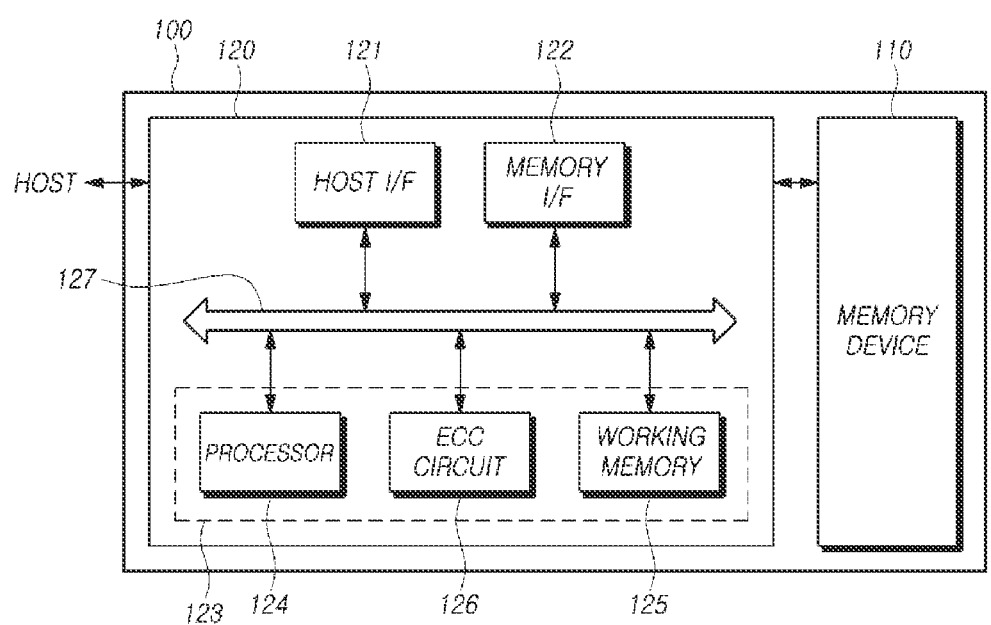
FIG. 1 is a schematic diagram illustrating a configuration of a memory system according to an embodiment of the present disclosure.

FIG. 1 is a schematic diagram illustrating a configuration of a memory system 100 according to an embodiment of the present disclosure.

Referring to FIG. 1, the memory system 100 may include a memory device 110 configured to store data, a memory controller 120 configured to control the memory device 110, and the like.

The memory device 110 includes multiple memory blocks and operates in response to control of the memory controller 120. Operations of the memory device 110 may include, for example, a read operation, a program operation (also referred to as "write operation"), an erase operation, and the like.

The memory device 110 may include a memory cell array including multiple memory cells (also simply referred to as "cell") configured to store data. The memory cell array may exist in a memory block.

The memory device 110 may be implemented as any of various types of memories, such as a double data rate synchronous dynamic random access memory (DDR SDRAM), a low power double data rate4 (LPDDR4) SDRAM, a graphics double data rate (DDDR) SDRAM, a low power DDR (LPDDR), a Rambus dynamic random access memory (RDRAM), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having a charge storage layer configured by a conductive floating gate, but also to a charge trap flash (CTF) having a charge storage layer configured by an insulating film.

The memory device 110 is configured to receive a command, an address, and the like from the memory controller 120 and to access an area selected by the address inside the memory cell array. That is, the memory device 110 may perform an operation corresponding to the command with regard to the area selected by the address.

For example, the memory device 110 may perform a program operation, a read operation, an erase operation, and the like. In relation thereto, during a program operation, the memory device 110 may program data in an area selected by an address. During a read operation, the memory device 110 may read data from an area selected by an address. During an erase operation, the memory device 110 may erase data stored in an area selected by an address.

The memory controller 120 may control a write (program) operation, a read operation, an erase operation, and a background operation regarding the memory device 110. The background operation may include a garbage collection (GC) operation, a wear leveling (WL) operation, and/or a bad block management (BBM) operation.

The memory controller 120 may control operations of the memory device 110 at the request of a host (HOST). Alternatively, the memory controller 120 may control operations of the memory device 110 regardless of the request of the host.

The memory controller 120 and the host may be separate devices. In another embodiment, the memory controller 120 and the host may be integrated into and implemented as a single device. By way of example, features and aspects of the present invention are described below in the context in which the memory controller 120 and the host are separate devices.

Referring to FIG. 1, the memory controller 120 may include a memory interface 122, a control circuit 123, and a host interface 121.

The host interface 121 is configured to provide an interface for communicating with the host.

When receiving a command from the host, the control circuit 123 may perform operations of receiving the command through the host interface 121 and processing the received command.

The memory interface 122 is connected to the memory device 110 and is configured to provide an interface for communicating with the memory device 110. That is, the memory interface 122 may be configured to provide an interface between the memory device 110 and the memory controller 120 in response to control of the control circuit 123.

The control circuit 123 is configured to control overall operations of the memory controller 120, thereby controlling operations of the memory device 110. To this end, the control circuit 123 may include a processor 124 and/or a working memory 124, and may further include an error detection-and-correction circuit (ECC circuit) 126, if necessary.

The processor 124 may control overall operations of the memory controller 120 and may perform logical operations. The processor 124 may communicate with the host through the host interface 121 and may communicate with the memory device 110 through the memory interface 122.

The processor 124 may perform the function of a flash translation layer (FTL). The processor 124 may convert a logical block address (LBA) provided by the host to a physical block address (PBA) through the FR, The FTL may receive the LBA and convert the same to the PBA by using a mapping table.

The FTL may map addresses in various methods, depending on the mapping unit, Typical address mapping methods include a page mapping method, a block mapping method, and a hybrid mapping method.

The processor 124 is configured to randomize data received from the host. For example, the processor 124 may randomize data received from the host by using a randomizing seed. The randomized data is provided to the memory device 110 as data to be stored, and is programmed in the memory cell array.

The processor 124 is configured to derandomize data received from the memory device 110 during a read operation. For example, the processor 124 may derandomize data received from the memory device 110 by using a derandomizing seed. The derandomized data may be output to the host.

The processor 124 may execute firmware so as to control operations of the memory controller 120. In other words, the processor 124 may control overall operations of the memory controller 120 and may execute (drive) firmware loaded into the working memory 125 during booting, in order to perform a logical operation.

The firmware may be a program executed inside the memory system 100, and may include various functional layers.

For example, the firmware may include a flash translation layer (FTL) configured to translate between a logical address that the host HOS requests the memory system 100 to provide and a physical address of the memory device 110, a host interface layer (HIL) configured to interpret a command that the host requests the memory system 100 (storage device) to follow and to deliver the same to the FTL, and/or a flash interface layer (FIL) configured to deliver a command issued by the FTL to the memory device 110.

The firmware may be stored in the memory device 110, for example, and then loaded into the working memory 125.

The working memory 125 may store firmware, program codes, commands, or data necessary to drive the memory controller 120. The working memory 125 may include, as a volatile memory, a static RAM (SRAM), a dynamic RAM (DRAM), and/or a synchronous DRAM (SDRAM), for example.

The error detection-and-correction circuit 126 may be configured to detect an error bit of checking target data by using an error correction code and to correct the detected error bit. The checking target data may be, for example, data stored in the working memory 125 or data retrieved from the memory device 110.

The error detection-and-correction circuit 126 may be implemented to decode data by using the error correction code. The error detection-and-correction circuit 126 may be implemented by various code decoders. For example, a decoder configured to perform unsystematic code decoding or a decoder configured to perform systematic code decoding may be used.

For example, the error detection-and-correction circuit 126 may detect error bits, sector by sector, with regard to respective pieces of read data. That is, each piece of read data may include multiple sectors. A sector may refer to a data unit smaller than a page, which is the read unit of a flash memory. Sectors constituting each piece of read data may correspond to each other via addresses.

The error detection-and-correction circuit 126 may calculate a bit error rate (BER) and determine whether or not each sector is correctable. For example, if the BER is higher than a reference value, the error detection-and-correction circuit 126 may determine that the corresponding sector is uncorrectable (or has failed). On the other hand, if the BER is lower than the reference value, the error detection-and-correction circuit 126 may determine that the corresponding sector is correctable (or has passed).

The error detection-and-correction circuit 126 may successively perform error detection and correction operations with regard to all pieces of read data. If a sector included in read data is correctable, the error detection-and-correction circuit 126 may omit the error detection and correction operations regarding the corresponding sector with regard to the next piece of read data. After the error detection correction operations are finished with regard to all pieces of read data in this manner, the error detection-and-correction circuit 126 may detect a sector deemed uncorrectable to the end. There may be one or more sectors deemed uncorrectable. The error detection-and-correction circuit 126 may deliver information (for example, address information) regarding the sector deemed uncorrectable to the processor 124.

The bus 127 may be configured to provide a channel between the components 121, 122, 124, 125, and 126 of the memory controller 120. The bus 127 may include, for example, a control bus for delivering various kinds of control signals and commands and a data bus for delivering various kinds of data.

The memory controller 120 and the above-mentioned components 121, 122, 124, 125, and 126 represents an example configuration. In other configurations, one or more of these components may be omitted, and/or one or more components may be integrated into a single component. Of course, the memory controller 120 may include one or more additional components.

Hereinafter, the memory device 110 is described in more detail with reference to FIG. 2.

Figure 2:
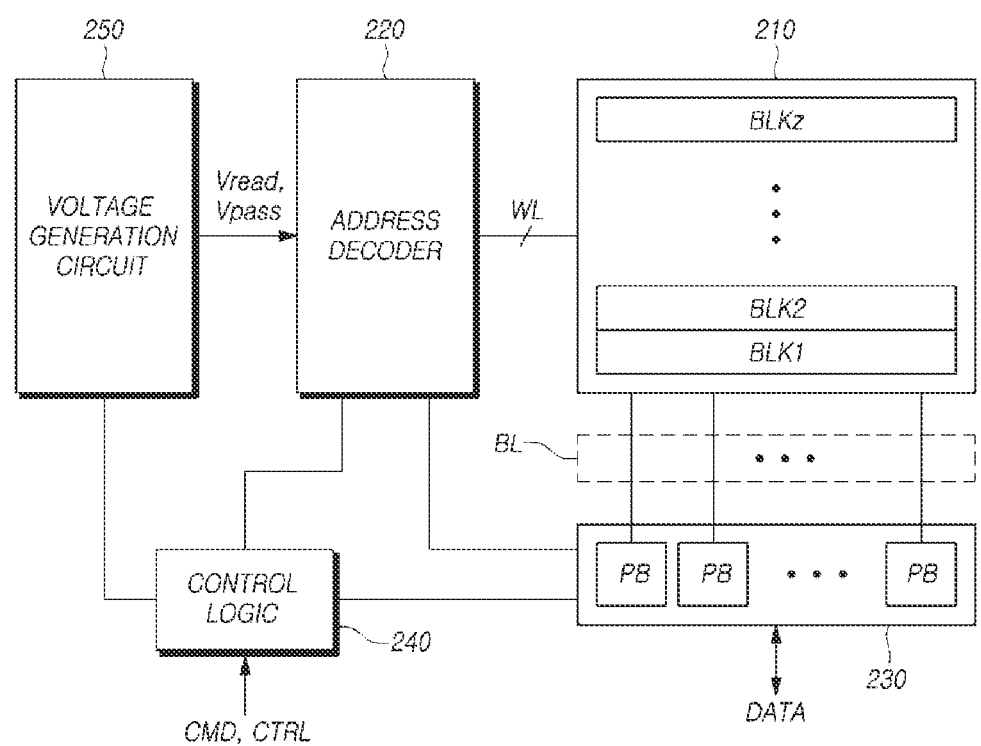
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read-and-write circuit 230, a control logic 240, a voltage generation circuit 250, and the like.

The memory cell array 210 may include multiple memory blocks BLK1-BLKz (z is a natural number equal to or larger than 2).

In the multiple memory blocks BLK1-BLKz, multiple word lines WL and multiple bit lines BL may be disposed, and multiple memory cells MC may be arranged therein.

The multiple memory blocks BLK1-BLKz may be connected to the address decoder 220 through the multiple word lines WL. The multiple memory blocks BLK1-BLKz may be connected to the read-and-write circuit 230 through the multiple bit lines BL.

Each of the multiple memory blocks BLK1-BLKz may include multiple memory cells. For example, the multiple memory cells may be nonvolatile memory cells, and may include nonvolatile memory cells having a vertical channel structure.

The memory cell array 210 may be configured as a two-dimensional structure, or a three-dimensional structure.

Each of the multiple memory cells included in the memory cell array 210 may store at least one bit of data. For example, each of the multiple memory cells included in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells each configured to store at least five bits of data.

Referring to FIG. 2, the address decoder 220, the read-and-write circuit 230, the control logic 240, the voltage generation circuit 250, and the like may operate as peripheral circuits configured to drive the memory cell array 210.

The address decoder 220 may be connected to the memory cell array 210 through multiple word lines WL.

The address decoder 220 may be configured to operate in response to control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

In the case of a read voltage applying operation during a read operation, the address decoder 220 may apply a read voltage Vread to a selected word line WL inside a selected memory block, and may apply a pass voltage Vpass to the remaining unselected word lines WL.

During a program verification operation, the address decoder 220 may apply a verification voltage generated by the voltage generation circuit 250 to the selected word line WL inside the selected memory block, and may apply a pass voltage Vpass to the remaining unselected word lines WL.

The address decoder 220 may be configured to decode a column address among received addresses. The address decoder 220 may transmit the decoded column address to the read-and-write circuit 230.

The read operation and program operation of the memory device 110 may be performed page by page. Addresses received when the read operation and program operation are requested may include a block address, a row address, and/or a column address.

The address decoder 220 may select one memory block and one word line according to the block address and the row address. The column address may be decoded by the address decoder 220 and provided to the read-and-write circuit 230.

The address decoder 220 may include a block decoder, a row decoder, a column decoder, and/or an address buffer.

The read-and-write circuit 230 may include multiple page buffers PB. The read-and-write circuit 230 may operate as a "read circuit" during a read operation of the memory cell array 210 and may operate as a "write circuit" during a write operation thereof.

The above-mentioned read-and-write circuit 230 is also referred to as a page buffer circuit including multiple page buffers PB, or a data register circuit. The read-and-write circuit 230 may include a data buffer for use in a data processing function, and may further include a cache buffer to perform a caching function, if necessary.

The multiple page buffers PB may be connected to the memory cell array 210 through multiple bit lines BL, During a read operation and a program verification operation, the multiple page buffers PB may continuously supply a sensing current to bit lines BL connected to memory cells, in order to sense the threshold voltage Vth of the memory cells, may sense a change in the amount of flowing current according to the program state of a corresponding memory cell through a sensing node, and may latch the same as sensing data.

The read-and-write circuit 230 may operate in response to page buffer control signals output from the control logic 240.

During a read operation, the read-and-write circuit 230 senses data in a memory cell, temporarily stores the retrieved data, and outputs the data (DATA) to the input/output buffer of the memory device 110. In an embodiment, the read-and-write circuit 230 may include a column selection circuit and the like in addition to the page buffers PB or page resisters.

The control logic 240 may be connected to the address decoder 220, the read-and-write circuit 230, the voltage generation circuit 250, and the like. The control logic 240 may receive a command CMD and a control signal CTRL through the input/output buffer of the memory device 110.

The control logic 240 may be configured to control overall operations of the memory device 110 in response to the control signal CTRL. The control logic 240 may output a control signal for adjusting the pre-charge potential level of sensing nodes of multiple page buffers PB.

The control logic 240 may control the read-and-write circuit 230 so as to perform a read operation of the memory cell array 210, In response to a voltage generation circuit control signal output from the control logic 240, the voltage generation circuit 250 may generate a read voltage Vread and a pass voltage Vpass, which are used during a read operation.

Figure 3:
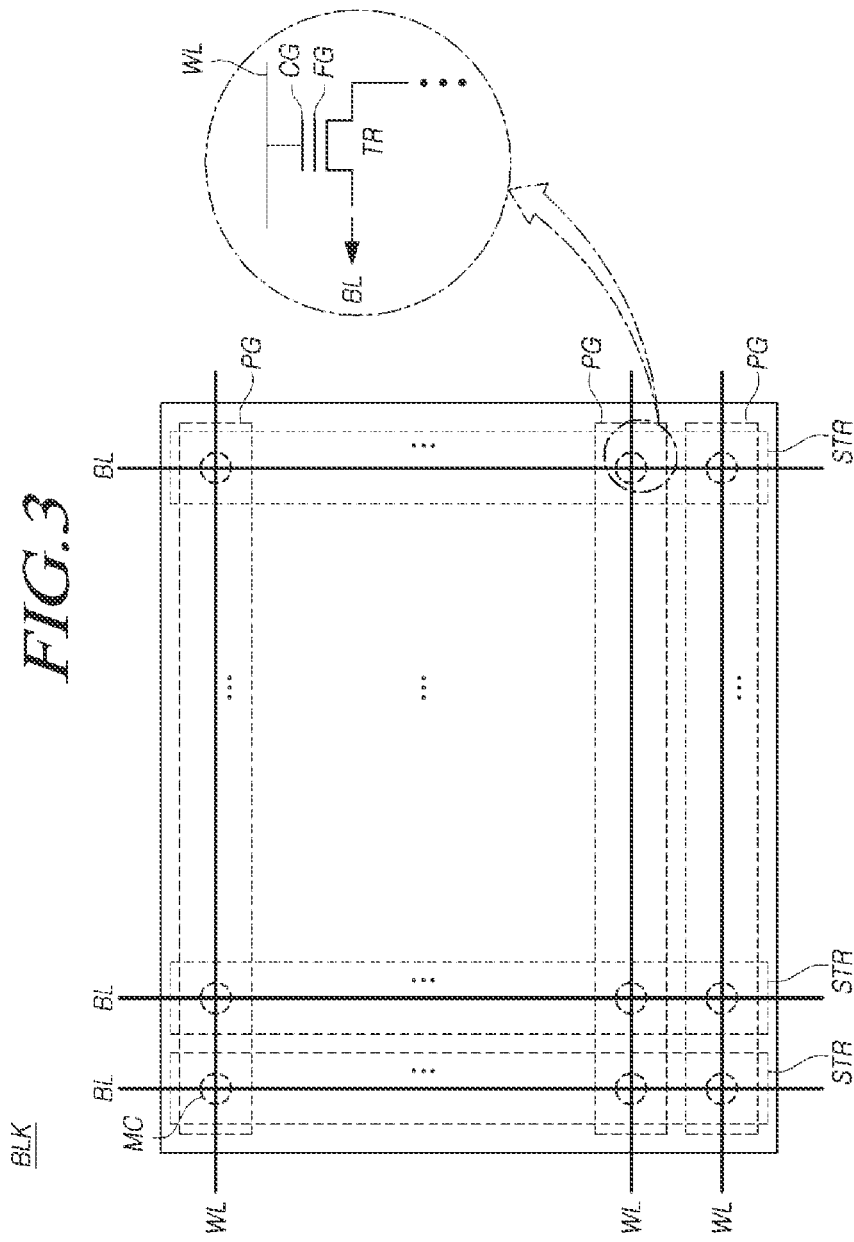
FIG. 3 is a diagram schematically illustrating respective memory blocks of a memory device according to an embodiment of the present disclosure.

FIG. 3 is a diagram schematically illustrating respective memory blocks BLK of a memory device 110 according to an embodiment of the present disclosure.

Referring to FIG. 3, a memory block BLK included in a memory device 110 may include, for example, multiple pages PG and multiple strings STR disposed in intersecting directions.

The multiple pages PG correspond to multiple word lines WL, and the multiple string STR correspond to multiple bit lines BL.

The memory block BLK may have multiple word lines WL and multiple bit lines BL disposed so as to intersect with each other. For example, each of the multiple word lines WL may be disposed in a row direction, and each of the multiple bit lines BL may be disposed in a column direction. As another example, each of the multiple word lines WL may be disposed in the column direction, and each of the multiple bit lines BL may be disposed in the row direction.

Multiple word lines WL and multiple bit lines BL may insect with each other, thereby defining multiple memory cells MC. Each memory cell MC may have a transistor TR disposed therein.

For example, the transistor TR disposed in each memory cell MC may include a drain, a source, a gate, and the like. The drain (or source) of the transistor TR may be directly connected to a corresponding bit line BL or connected thereto via another transistor TR. The source (or drain) of the transistor TR may be directly connected to a source line (which may be ground) or connected thereto via another transistor TR. The gate of the transistor TR may include a floating gate (FG) surrounded by an insulator and a control gate (CG) to which a gate voltage is applied from a word line WL.

Each of the multiple memory blocks BLK1-BLKz may have a first selection line (also referred to as a source selection line or a drain selection line) additionally disposed outside a first outermost word line, which is closer to the read-and-write circuit 230 among two outermost word lines BL, and may have a second selection line (also referred to as a drain selection line or a source selection line) additionally disposed outside a second outermost word line, which is the other among the same.

If necessary, at least one dummy word line nay be additionally disposed between the first outermost word line and the first selection line. In addition, at least one dummy word line may be additionally disposed between the second outermost word line and the second selection line.

Figure 4:
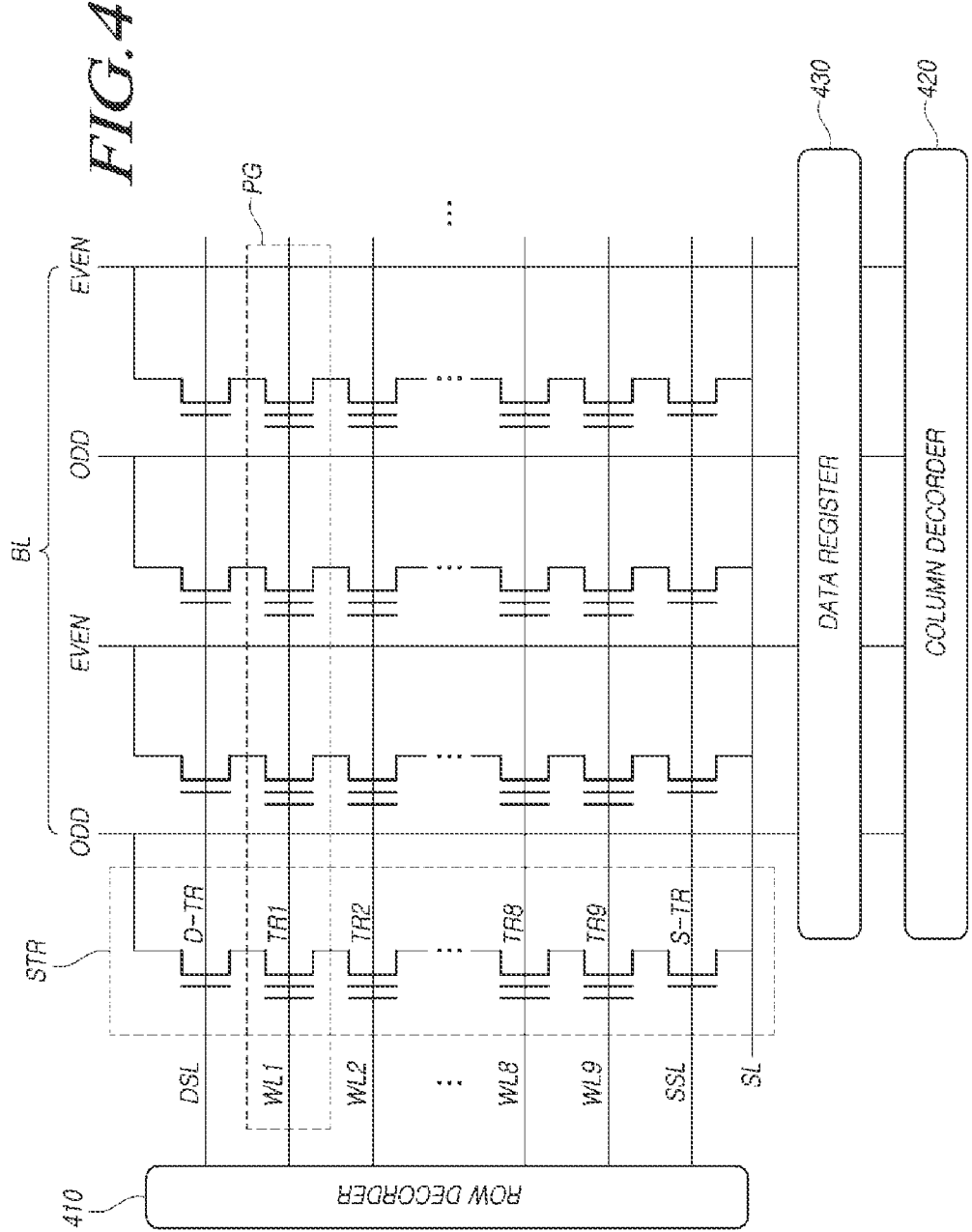
FIG. 4 is a diagram illustrating a structure of word lines and bit lines of a memory device according to an embodiment of the present disclosure.

When having a memory block structure as illustrated in FIG. 3, a read operation and a program operation (write operation) may be performed page by page, and an erase operation may be performed for each memory block, FIG. 4 is a diagram illustrating the structure of word lines WL and bit lines BL of a memory device 110 according to an embodiment of the present disclosure.

Referring to FIG. 4, the memory device 110 includes a core area in which memory cells MC are concentrated and an auxiliary area which corresponds to the other area than the core area, and which supports operations of the memory cell array 210.

The core area may include pages PG and string STR. The core area has multiple word lines WL1-WL9 and multiple bit lines BL disposed to intersect with each other.

The multiple word lines WL1-WL9 may be connected to a row decoder 410, and the multiple bit lines BL may be connected to a column decoder 420. A data register 430, which corresponds to a read-and-write circuit 230, may exist between the multiple bit lines BL and the column decoder 420.

The multiple word lines WL1-WL9 correspond to multiple pages PG.

For example, as illustrated in FIG. 4, each of the multiple word lines WL1-WL9 may correspond to one page PG. Alternatively, when each of the multiple word lines WL1-WL9 has a large size, each of the multiple word lines WL1-WL9 may correspond to at least two (for example, two or four) pages PG. A page PG serves as the smallest unit in connection with conducting a program operation and a read operation, and all memory cells MC in the same page PG may perform simultaneous operations during a program operation and a read operation.

Among the multiple bit lines BL, odd-numbers bit lines BL and even-numbered bit lines BL may be distinguished and accordingly connected to the column decoder 420.

In order to access a memory cell MC, the address goes through the input/output end and then enters the core area through the row decoder 410 and the column decoder 420, and the target memory cell then can be designated. As used herein, designating a target memory cell refers to accessing one of memory cells MC at sites of intersection between word lines WL1-WL9 connected to the row decoder 410 and bit lines BL connected to the column decoder 420, in order to program data therein or to read programmed data therefrom.

Pages PG in a first direction (for example, X-axis direction) are grouped by a commonly used line referred to as a word line WL, and strings STR in a second direction (for example, Y-axis direction) are grouped (connected) by a common line referred to as a bit line BL. As used herein, being commonly grouped means that they are structurally connected by the same material, and the same voltage is simultaneously applied thereto during voltage application. Obviously, the voltage applied to a memory cell MC in the intermediate or last position among memory cells MC connected in series may slightly differ from the voltage applied to the memory cell MC in the first position and the voltage applied to the memory cell MC in the last position, due to the voltage drop occurring in the memory cell MC positioned in front thereof.

All data processed by the memory device 110 is programmed and read via the data register 430, which thus plays an essential role. If data processing by the data register 430 slows down, all other areas need to wait until the data register 430 finishes the data processing. In addition, performance degradation of the data register 430 may be followed by overall performance degradation of the memory device 110.

Referring to the example in FIG. 4, multiple transistors TR1-TR9 may exist in one string STR while being connected to multiple word lines WL1-WL9. The areas in which the multiple transistors TR1-TR9 exist correspond to memory cells MC. The multiple transistors TR1-TR9 are transistors including control gates CG and floating gates FG, as described above.

The multiple word lines WL1-WL9 include two outermost word lines WL1 and WL9. A first selection line DSL may be additionally disposed outside the first outermost word line WL1, which is closer to the data register 430 in terms of the signal path among the two outermost word lines WL1 and WL9, and a second selection line SSL may be additionally disposed outside the second outermost word line WL9 which is the other thereof.

The first selection transistor D-TR, which is controlled to turn on/off by the first selection line DSL, has a gate electrode connected to the first selection line DSL but includes no floating gate FG. The second selection transistor S-TR, which is controlled to turn on/off by the second selection line SSL, has a gate electrode connected to the second selection line SSL but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR are positioned on both ends of the corresponding string STR and play the role of gatekeepers that connect and disconnect signals.

During a program operation, the memory system 100 needs to fill the target memory cell MC of the bit line BL, which is to be programmed, with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

During a read operation or a verification operation, the memory system 100 turns on both the first selection transistor D-TR and the second selection transistor S-TR. Accordingly, a current may flow through the corresponding string STR and drain to a source line SL corresponding to the ground, thereby making it possible to measure the voltage level of the bit line BL. However, during a read operation, there may be a time difference in the on-off timing between the first selection transistor D-TR and the second selection transistor S-TR.

During an erase operation, the memory system 100 may supply a voltage (for example, +20V) to the substrate through the source line SL. During the erase operation, the memory system 100 floats both the first selection transistor D-TR and the second selection transistor S-TR, thereby generating an infinite resistance. The resulting structure removes the roles of the first selection transistor D-TR and the second selection transistor S-TR, and enables electrons to operate by means of the potential difference only between the floating gate FG and the substrate.

Figure 5:
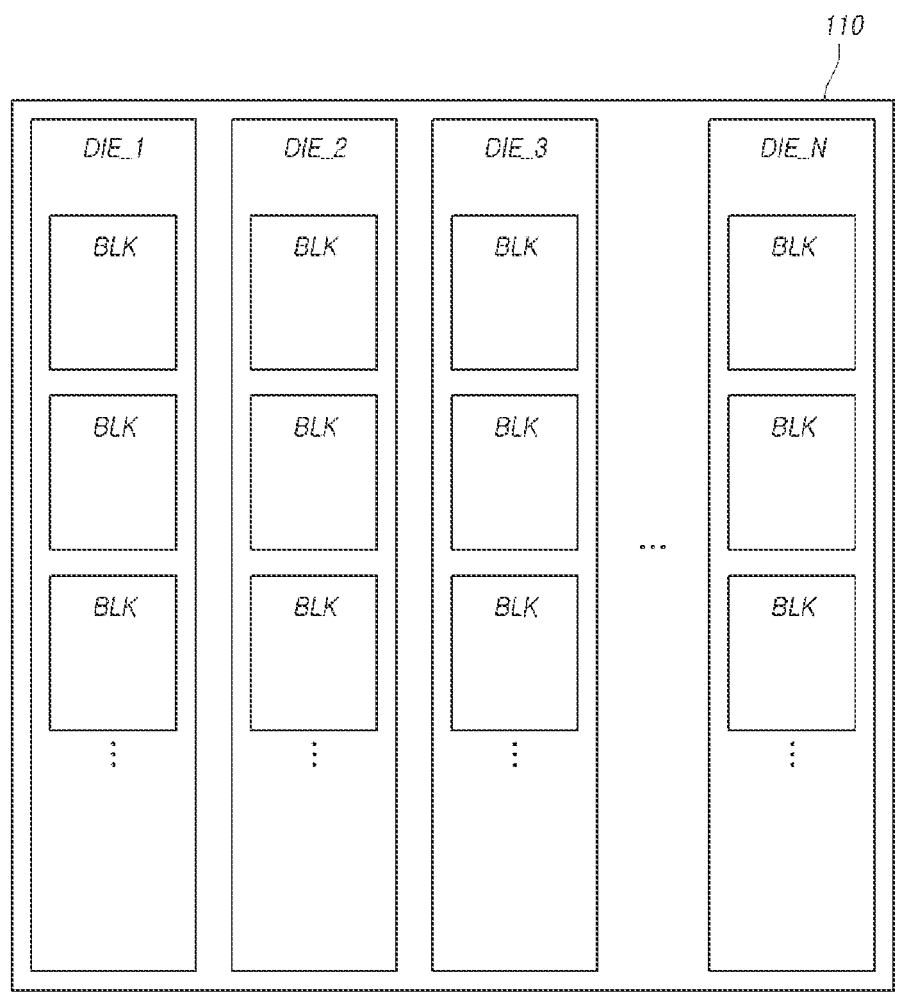
FIG. 5 is a diagram illustrating a structure of a memory device according to an embodiment of the present disclosure.

FIG. 5 is a diagram illustrating the structure of a memory device 110 according to an embodiment of the present disclosure.

Referring to FIG. 5, the memory device 110 may include multiple memory dies DIE_1 to DIE_N. Each of the multiple memory dies DIE_1 to DIE_N may include a subset of the multiple memory blocks in the memory device 110.

The memory device 110 may perform read/write/erase operations in parallel with regard to the multiple memory dies DIE_1 to DIE_N. For example, the memory device 110 may write data in one of memory blocks in a memory die DIE_1 and may simultaneously erase one of memory blocks in another memory die DIE_2.

The following description is directed to a process of controlling an operation of the memory system 100, according to an embodiment of the present disclosure, of writing metadata in the memory device 110, and an operation of erasing some of memory blocks BLK in the memory device 110.

Metadata refers to data for managing user data written in the memory device 110 at the request of the host. For example, the metadata may be logical-to-physical (L2P) map information, valid page table (VPT) information, and the like.

The memory system 100 may divide metadata into metadata units, each having a fixed size and may write the same in the memory device 110. For example, the size of a single metadata unit may correspond to the size of a page.

Figure 6:
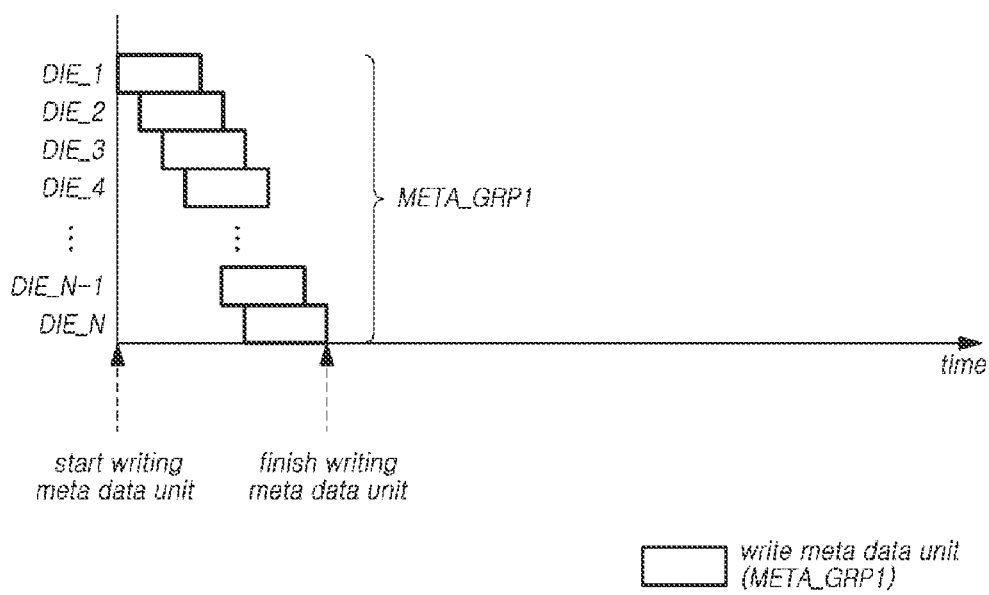
FIG. 6 is a diagram illustrating an operation of a memory system, according to an embodiment of the present disclosure, of writing metadata units included in a first metadata unit group.

FIG. 6 is a diagram illustrating an operation of a memory system 100 according to an embodiment of the present disclosure, of writing metadata units included in a first metadata unit group META_GRP1.

The memory controller 120 in the memory system 100 may start an operation of writing each of multiple metadata units included in the first metadata unit group META_GRP1 in one of multiple memory dies DIE_1 to DIE_N in the memory device 110.

Memory cells in memory blocks in which metadata units are written may be single-level cells (SLC). Metadata has a small size but has a high degree of importance because the same is necessary to manage user data. Accordingly, metadata needs to be written in the memory device 110 faster than user data, and the possibility that the metadata will fail needs to be minimized.

Multiple metadata units may be written in the multiple memory dies DIE_1 to DIE_N, respectively, That is, for N memory dies DIE_1 to DIE_N (N is a natural number equal to or larger than 2), and N pieces of metadata, the memory controller 120 may write the N pieces of metadata in the N memory dies DIE_1 to DIE_N one by one, and may control the metadata writing such only one piece of metadata is written in each memory die.

Each of the multiple metadata units may be written in one of the multiple memory dies DIE_1 to at a different time. Referring to FIG. 6, the metadata writing process starts by writing a first metadata unit to DIE_1. After the writing of the first metadata unit has started, the writing of a second metadata unit to DIE_2 is started, after which the writing of a third metadata unit to DIE_3 is started, and so on up to the Nth piece of metadata which is written to DIE_N, Thus, the write starting times of the respective pieces of metadata in the respective dies are staggered or offset with respect to each other.

The reason metadata units are written in respective memory dies at different times in this manner is because the memory controller 120 successively inputs metadata units into the memory device 110. For example, the memory controller 120 first inputs a metadata unit to be written in the memory die DIE_1 into the memory device, and then inputs a metadata unit to be written in the memory die DIE_2 into the memory device. Accordingly, the memory device 110 may first write the metadata unit to be written in the memory die DIE_1.

While the memory controller 120 performs an operation of writing each of multiple metadata units in the first metadata unit group META_GRP1 in a corresponding one of multiple memory dies DIE_1 to DIE_N in the memory device 110, the data map (a material structure for storing mapping information between logical addresses and physical addresses of user data stored in the memory device 100) stored in the memory device 110 is in a busy state. The memory controller 120 may perform other operations (for example, operations of reading/writing user data) after writing all of the multiple metadata units in the memory device 110.

Accordingly, in order for the memory system 100 to ensure a quality of service (QoS) required by the host the memory controller 120 has to minimize the overall time taken to write multiple metadata units in the first metadata unit group META_GRP1 in the memory device 110.

However, if the memory controller 120 has first requested the memory device 110 to perform an erase operation, the memory controller 120 may not write multiple metadata units in the first metadata unit group META_GRP1 in the memory device 110 until after the erase operation is completed. In this case, the time at which the metadata units in the first metadata unit group META_GRP1 are written in the memory device 110 is delayed. Accordingly, there may be a problem in that the memory system 100 cannot ensure the host-required QoS.

Hereinafter, an operation example of the memory controller 120 in the memory system 100 of adjusting the time at which metadata units are written and the time at which an erase operation is performed, in order to enable the memory system 100 to ensure a QoS requested by the host, is described.

Figure 7:
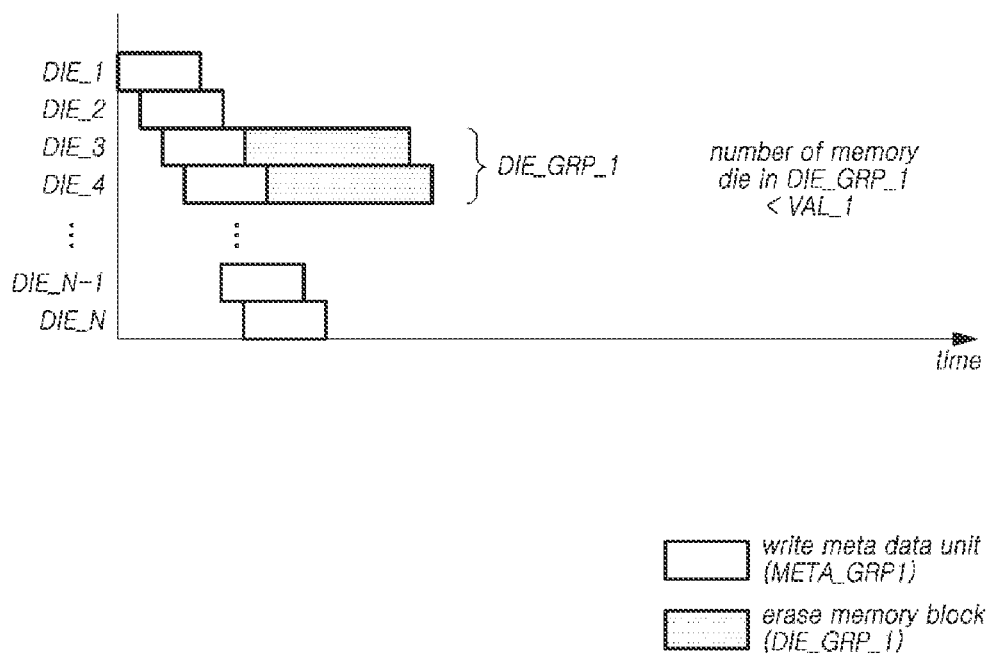
FIG. 7 is a diagram illustrating an operation of the memory system, according to an embodiment of the present disclosure, of erasing at least one of memory blocks included in a first memory die group.

FIG. 7 is a diagram illustrating an operation of the memory system 100, according to an embodiment of the present disclosure, of erasing at least one of memory blocks in the first memory die group DIE_GRP_1.

Referring to FIG. 7, the memory controller 120 in the memory system 100 may start an operation of writing each of multiple metadata units included in the first metadata unit group META_GRP1 in one of multiple memory dies DIE_1 to DIE_N and may then confirm whether or not there is a request for an erase operation with regard to at least one of the multiple memory dies DIE_1 to DIE_N. For example, the memory controller 120 may search a queue of stored outstanding operation requests and may confirm based the result of the search whether or not there is an erase operation request in the queue.

If the above-mentioned erase operation request exists, the memory controller 120 may then perform an erase operation with regard to a memory die in the first memory die group DIE_GRP_1. As used herein, performing an erase operation with regard to a memory die in the first memory die group DIE_GRP_1 refers to performing an operation of erasing at least one of memory blocks in a memory die in the first memory die group DIE_GRP_1.

The memory controller 120 may write at least one of multiple metadata units in the first metadata unit group META_GRP_1 in a memory die in the first memory die group DIE_GRP_1.

The memory controller 120 may alternately perform the write operation and the erase operation on different blocks within a memory die. For example, the memory controller 120 may alternately perform the write operation on a block within DIE_3 and the erase operation on a different block in DIE_3, as illustrated in FIG. 7.

The reason the memory controller 120 first starts an operation of writing a metadata unit and then performs an operation of erasing at least one of memory blocks in the first memory die group DIE_GRP_1 in the above manner is as follows.

If the operation of erasing at least one of memory blocks in the first memory die group DIE_GRP_1 is performed earlier than the operation of writing a metadata unit, the metadata writing operation is delayed by the time taken to erase the target memory block(s) in the first memory die group DIE_GRP_1. Accordingly, a subsequent operation (for example, read/write operation) after writing the metadata unit in the memory device 110 is also delayed, and this may cause a problem in that the memory system 100 cannot ensure the QoS required by the host.

The number of memory dies in the first memory die group DIE_GRP_1 may be a first value VAL_1 or less. That is, instead of simultaneously performing an erase operation with regard to all of the multiple memory dies DIE_1 to DIE_N in the memory device 110, the memory controller 120 may simultaneously perform an erase operation only with regard to a number of memory dies less than or equal to the first value VAL_1.

For example, If the first value VAL_1 is 2, the memory controller 120 may simultaneously perform the erase operation only with regard to two memory dies among a total of 64 memory dies.

When performing an erase operation with regard to memory dies included in the first memory die group DIE_GRP_1, the memory controller 120 may erase only one memory block with regard to each memory die. If the memory controller 120 simultaneously erases multiple memory blocks included in a specific memory die, the time during which the erase operation is performed with regard to the corresponding memory die may be increased, and the memory controller 120 cannot perform another operation (for example, read/write) with regard to the corresponding memory die during that time.

Figure 8:
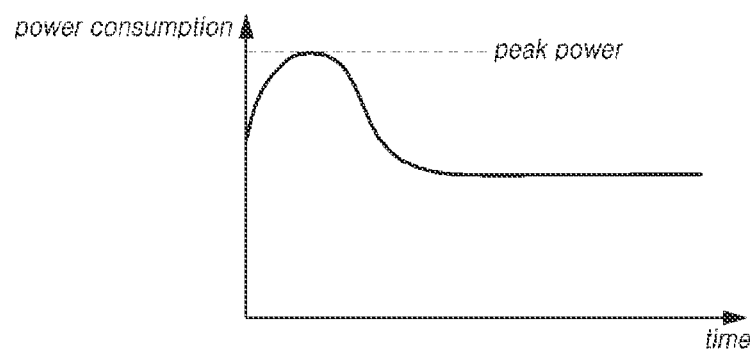
FIG. 8 is a diagram illustrating an amount of power consumed during an erase operation, over time, in a memory system according to an embodiment of the present disclosure.

As described above, the reason the memory controller 120 performs an erase operation with regard to only some of multiple memory dies DIE_1 to DIE_N is because, if the memory controller 120 performs the erase operation with regard to all of the multiple memory dies to the peak power consumed by the memory device 110 may increase abruptly, thereby posing a problem. This is described below with reference to FIG. 8, FIG. 8 is a diagram illustrating the amount of power consumed during an erase operation, over time, in a memory system 100 according to an embodiment of the present disclosure.

When the memory device 110 starts a memory block erase operation, the memory device 110 consumes peak power immediately after the erase operation is started, after which the amount of power consumed drops and eventually reaches a steady state.

Accordingly, if the memory controller 120 simultaneously performs the erase operation with regard to all of the multiple memory dies DIE_1 to the times at which the multiple memory dies DIE_1 to DIE_N consume peak power, respectively, overlap. This may pose a problem in that the peak power consumed by the memory device 110 increases abruptly.

Accordingly, the memory controller 120 may conduct control such that the erase operation is performed only with regard to as many memory dices as the above-mentioned first value VAL_1 or less. This may enable the memory controller 120 to prevent the problem of abrupt increase of the peak power consumed by the memory device 110 and to minimize the magnitude of the consumed peak power.

The above-mentioned first value VAL_1 may be determined on the basis of peak power that can be consumed by the memory device 110 and peak power consumed when one memory block included in multiple memory dies is erased.

For example, if the value of peak power that can be consumed by the memory device 110 at a specific time is 100, and if peak power consumed when one memory block is erased is 50, the first value VAL_1 may be determined as 100/50=2.

In an embodiment of the present disclosure, the memory system 100 may write multiple metadata units, may perform an erase operation with regard to some of multiple memory dies, and may again write a new metadata unit.

Figure 9:
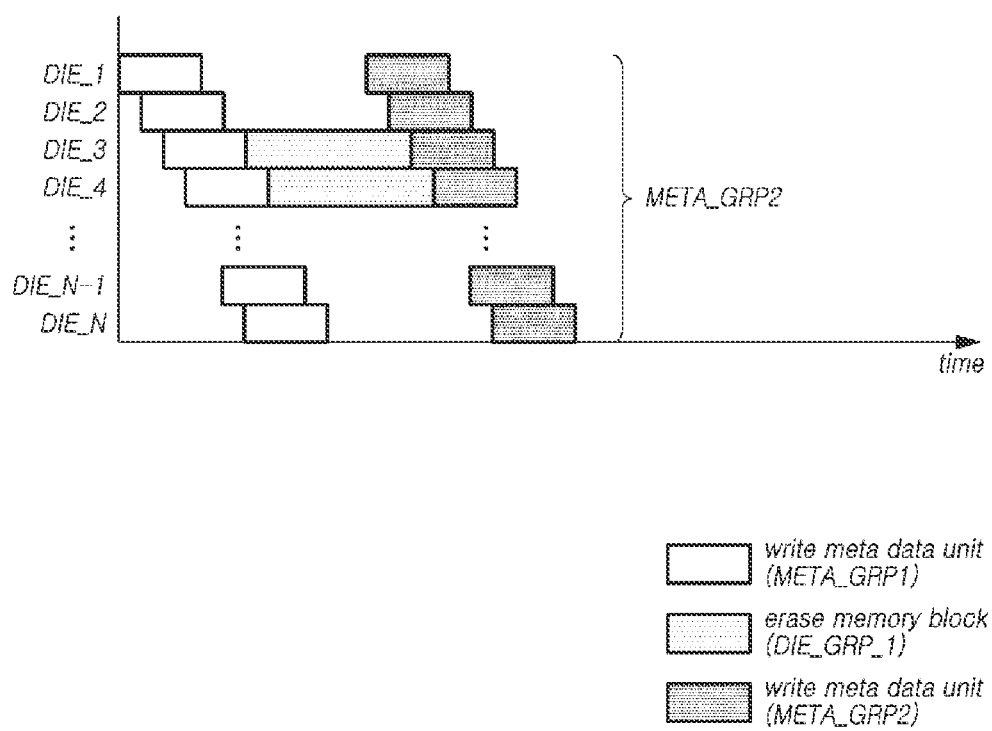
FIG. 9 is a diagram illustrating an operation of a memory system, according to an embodiment of the present disclosure, of writing a metadata unit included in a second metadata unit group.

FIG. 9 is a diagram illustrating an operation of a memory system 100, according to an embodiment of the present disclosure, of writing a metadata unit included in a second metadata unit group META_GRP_2.

Referring to FIG. 9, the memory controller 120 may start erasing at least one of memory blocks included in the first memory die group DIE_GRP_1 and may then write each of multiple metadata units included in the second metadata unit group META_GRP_2 in one of multiple memory dies DIE_1 to DIE_N.

Figure 10:
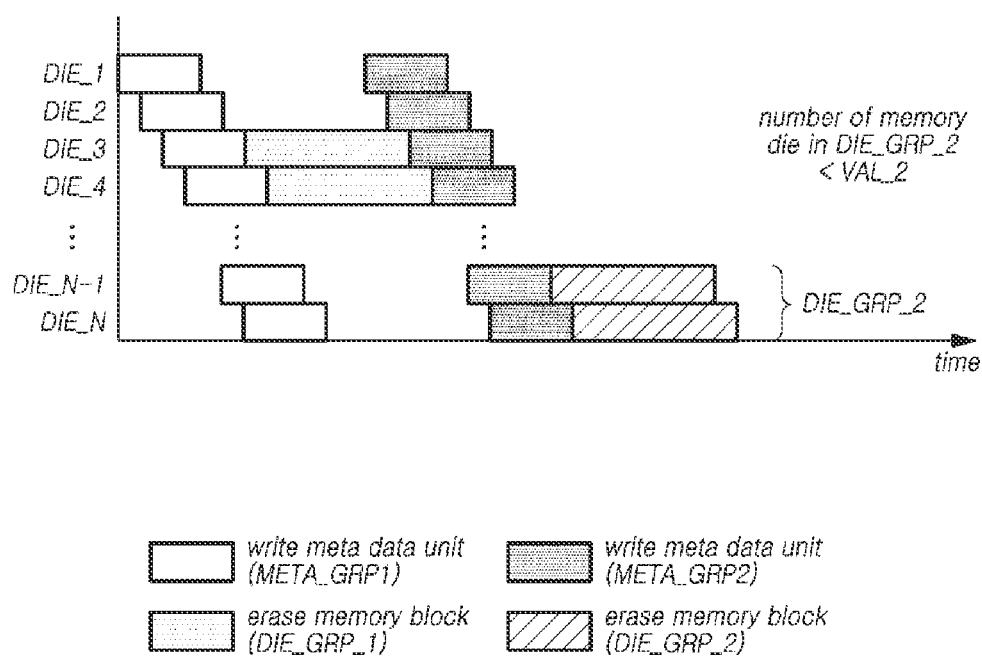
FIG. 10 is a diagram illustrating an operation of a memory system, according to an embodiment of the present disclosure, of erasing at least one of memory blocks included in the second metadata unit group.

FIG. 10 is a diagram illustrating an operation of the memory system 100, according to an embodiment of the present disclosure, of erasing at least one of memory blocks included in the second metadata unit group META_GRP_2.

Referring to FIG. 10, the memory controller 120 in the memory system 100 may start writing each of multiple metadata units in the second metadata unit group META_GRP_2 in a corresponding one of multiple memory dies DIE_1 to DIE_N and may then simultaneously perform an erase operation with regard to memory dies in the second memory die group DIE_GRP_2 which has a number of memory dies less than or equal to a second value VAL_2, among the multiple memory dies DIE_1 to DIE_N. As used herein, performing an erase operation with regard to memory dies in the second memory die group DIE_GRP_2 refers to performing an operation of erasing at least one of memory blocks in memory dies included in the second memory die group DIE_GRP_2.

For example, If the first value VAL_2 is 3, the memory controller 120 may simultaneously perform the erase operation only with regard to three memory dies among a total of 64 memory dies.

The memory controller 120 may write at least one of multiple metadata units included in the second metadata unit group META_GRP_2 in memory dies included in the second memory die group DIE_GRP_2.

The memory dies in the first memory die group DIE_GRP_1 and the memory dies in the second memory die group DIE_GRP_2 are different from each other. The first memory die group DIE_GRP_1 and the second memory die group DIE_GRP_2 do not have any common memory die.

That is, the memory controller 120 may perform a distributed erase operation with regard to multiple memory dies included in the memory device 110 between times at which metadata units are written in the memory dies of the memory device 110.

This enables the memory controller 120 to prevent a problem of increased peak power consumed by the memory device 110 resulting from erase operations simultaneously performed by a large number of memory dies.

The time at which the memory controller 120 starts writing multiple metadata units included in the first metadata unit group META_GRP_1 described above in the memory device 110 and the time at which the memory controller 120 starts writing multiple metadata units included in the second metadata unit group META_GRP_2 in the memory device 110 may be determined by a specific period.

Figure 11:
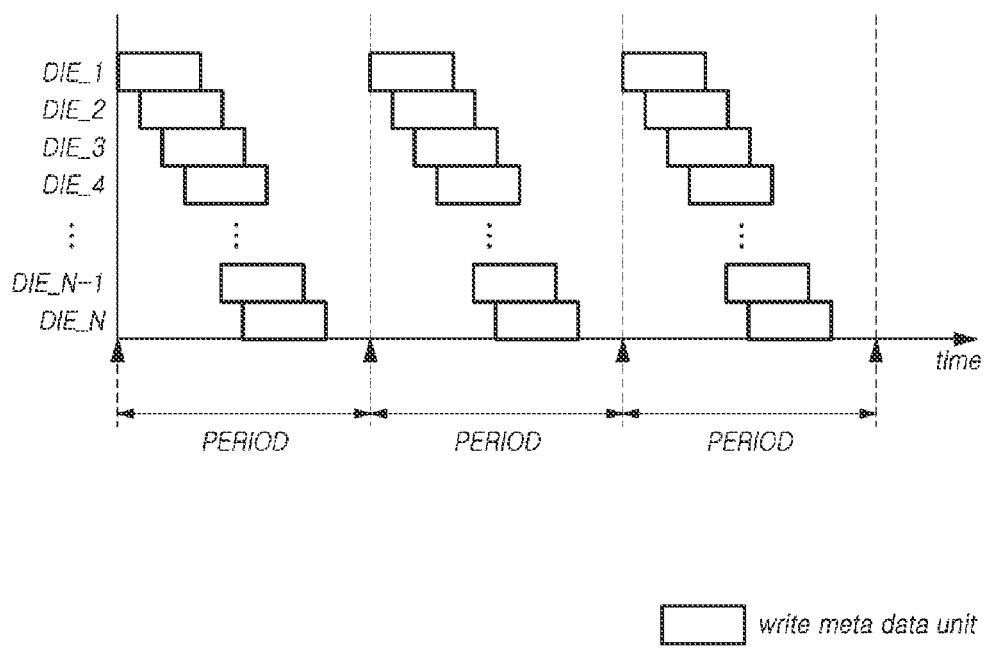
FIG. 11 is a diagram illustrating an operation of a memory system, according to an embodiment of the present disclosure, of writing metadata units periodically.

FIG. 11 is a diagram illustrating an operation of a memory system 100, according to an embodiment of the present disclosure, of writing metadata units periodically.

Referring to FIG. 11, the memory controller 120 included in the memory system 100 may write multiple metadata units in the memory device 110 at each period PERIOD. In this case, the interval between the time at which writing of the multiple metadata units in the first metadata unit group META_GRP_1 in the memory device 110 is started and the time at which writing of the multiple metadata units in the second metadata unit group META_GRP_2 in the memory device 110 is started may represent the period (PERIOD).

When metadata units are periodically written in the memory device 110 in this manner, the memory controller 120 may no select a time at which the same can perform an erase operation on the basis of the period described above.

If the period at which metadata units are written is longer than the time taken to perform an erase operation with regard to memory dies, the memory controller 120 may perform an additional operation between the time at which metadata units are written and the time at which an erase operation is performed with regard to memory dies.

Figure 12:
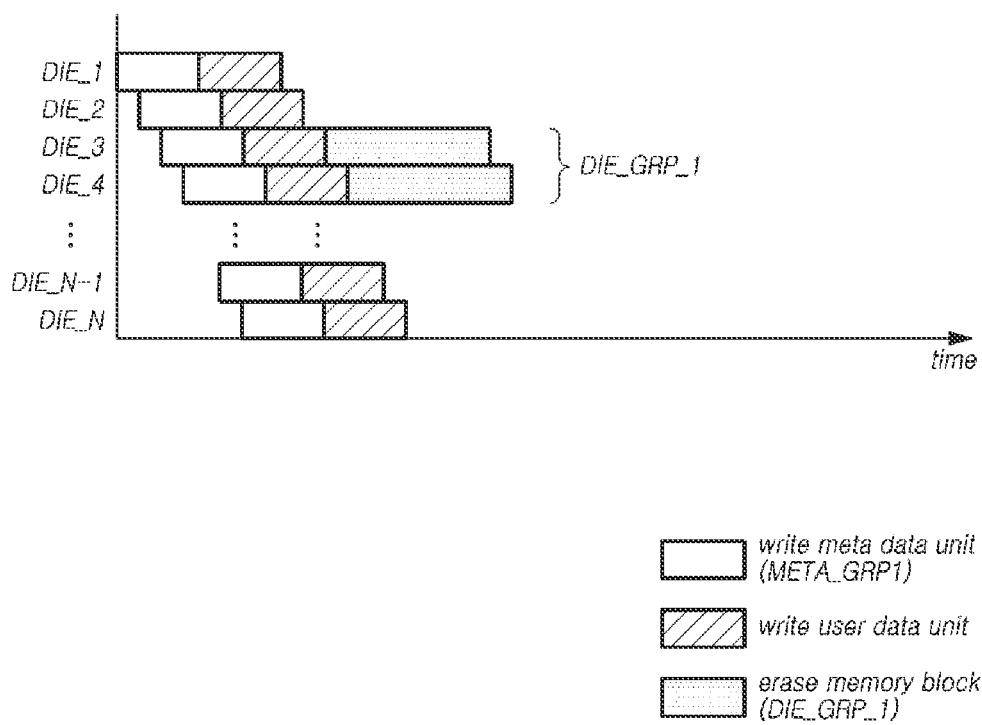
FIG. 12 is a diagram illustrating an operation of a memory system according to an embodiment of writing user data.

FIG. 12 is a diagram illustrating an operation of a memory system 100 according to an embodiment of writing user data.

Referring to FIG. 12, the memory controller 120 included in the memory system 100 may write user data in at least one of multiple memory dies DIE_1 to DIE_N during a period of time between i) the start of writing each of multiple metadata units in the first metadata unit group META_GRP_1 in one of multiple memory dies DIE_1 to DIE_N and ii) the start of an operation of erasing at least one of memory blocks included in the first memory die group DIE_GRP_1. The memory controller 120 may divide the user data into at least one user data piece having a fixed size and may write each user data piece in at least one of the multiple memory dies DIE_1 to DIE_N.

The size of the user data piece may be determined on the basis of the time taken to write user data with regard to each memory die, the time necessary to perform an erase operation with regard to memory dies and the period during which metadata units are written in the memory device 110.

It is assumed that the time taken to write user data having a size of one page (for example, 8 KB) with regard to each memory die is 1000 us, the time necessary to perform an erase operation with regard to a memory die, that is, operation of erasing one memory block included in the memory die, is 6000 us, and the period at which metadata units are written in the memory device 110 is 9000 us.

In this case, the memory controller 120 may write a user data piece having a size of (9000−6000)/1000=3 pages in one of multiple memory dies DIE_1 to DIE_N.

Figure 13:
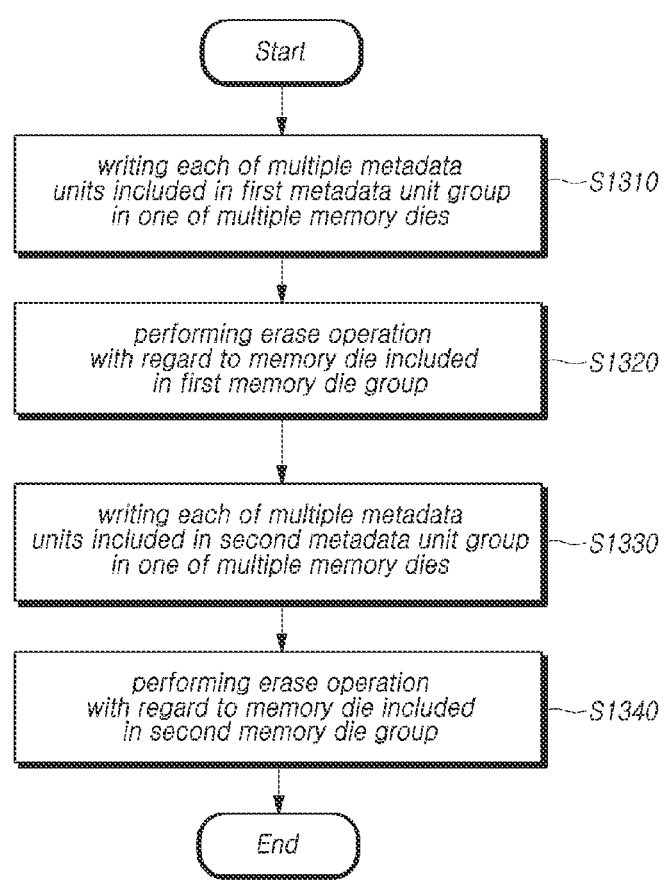
FIG. 13 is a flowchart illustrating a method for operating a memory controller according to an embodiment of the present disclosure.

FIG. 13 is a flowchart illustrating a method for operating a memory controller 120 according to an embodiment of the present disclosure.

The method for operating a memory controller 120 may include writing each of multiple metadata units included in a first metadata unit group META_GRP_1 in one of multiple dies DIE_1 to DIE_N included in a memory device 110 (51310).

In addition, the method for operating a memory controller 120 may include performing, when there is a request for an erase operation with regard to at least one of multiple memory dies DIE_1 to DIE_N, the erase operation with regard to memory dies included in a first memory die group DIE_GRP_1, which has a number of memory dies less than or equal to a first value VAL_1, among multiple memory dies DIE_1 to DIE_N_1 in the memory device 110 (51320). In this case, at least one of multiple metadata units included in the first metadata unit group META_GRP_1 is written in a memory die in the first memory die group DIE_GRP_1.

In addition, the method for operating a memory controller 120 may include writing, after start of the erase operation on at least one of memory blocks in the memory dies in the first memory die group DIE_GRP_1, each of multiple metadata units in the second metadata unit group META_GRP_2 in one of the multiple memory dies DIE_1 to DIE_N (S1330).

In addition, the method for operating a memory controller 120 may include performing, after start of the writing of each of multiple metadata units in the second metadata unit group ME in one of the multiple memory dies DIE_1 to DIE_N, the erase operation with regard to memory dies in the second memory die group DIE_GRP_2, having a second value VAL_2 or less of memory dies, among multiple memory dies DIE_1 to DIE_N (S1340).

In this case, at least one of multiple metadata units in the second metadata unit group META_GRP_2 is written in a memory die in the second memory die group DIE_GRP_2.

In this case, memory dies in the first memory die group DIE_GRP_1 and memory dies in the second memory die group DIE_GRP_2 may differ from each other.

The above-described operations of the memory controller 120 may be controlled by the control circuit 123, and may be performed in such a manner that the processor 124 executes (drives) firmware to perform such operations.

Figure 14:
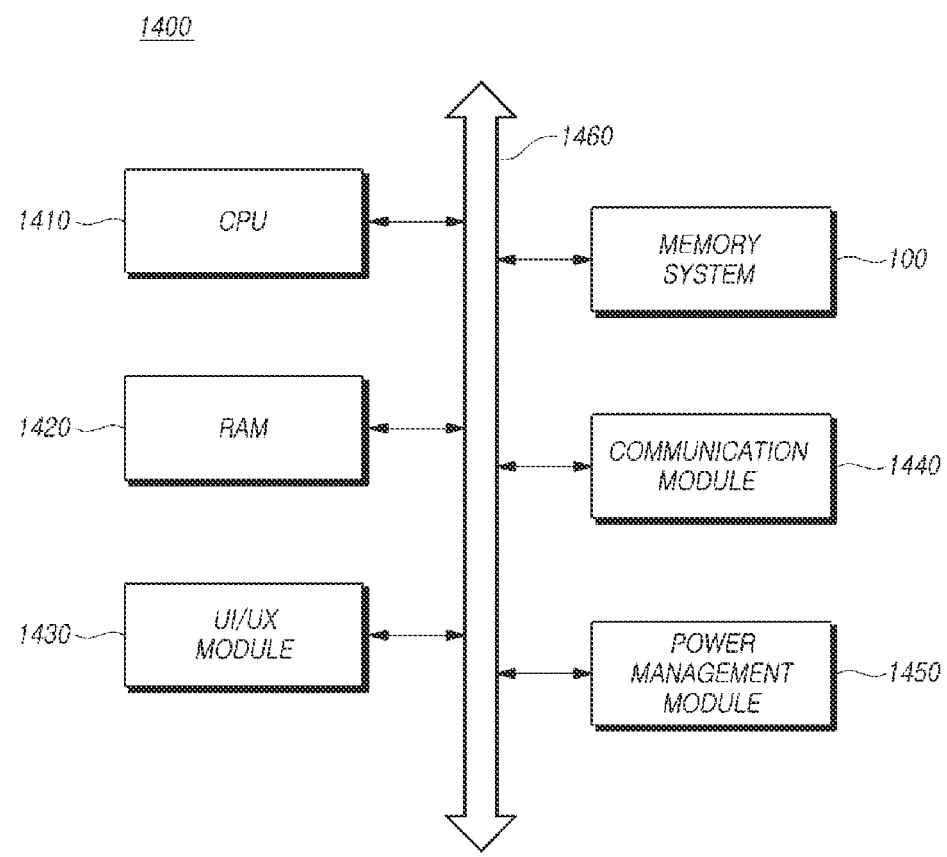
FIG. 14 is a diagram illustrating a configuration of a computing system according to an embodiment of the present disclosure.

FIG. 14 is a diagram illustrating a configuration of a computing system 1400 according to an embodiment of the present disclosure.

Referring to FIG. 14, the computing system 1400 may include: a memory system 100 electrically connected to a system bus 1460; a CPU 1410 configured to control overall operations of the computing system 1400; a RAM 1420 configured to store data and information related to operations of the computing system 1400; a user interface/user experience (UI/UX) module 1430 configured to provide the user with a user environment; a communication module 1440 configured to communicate with an external device in a wired and/or wireless manner; a power management module 1450 configured to manage power used by the computing system 1400; and the like.

The computing system 1400 may be a personal computer (PC) or may include a mobile terminal (for example, a smartphone or a tablet) or various kinds of other electronic devices.

The computing system 1400 may further include a battery for supplying a dynamic voltage, an application chipset, a graphic-related module, a camera image processor (CIS), and a DRAM. It is obvious to a person skilled in the art that the computing system 1300 may further include other components.

The memory system 100 may include not only a device configured to store data in a magnetic disk, such as a hard disk drive (HDD), but also a device configured to store data in a nonvolatile memory, such as a solid state drive (SSD), a universal flash storage (UFS) device, and an embedded MMC (eMMC) device. The nonvolatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM), Furthermore, the memory system 100 may be implemented as any of various storage devices and mounted inside any of various electronic devices.

Although the present invention has been illustrated and described in connection with various embodiments, those skilled in the art will appreciate that various modifications and changes may be made without departing from the scope and spirit of the present invention. Thus, the present invention is not limited by or to any of the disclosed embodiments. Rather, the present invention encompasses all modifications and variations that fall with the scope of the claims including their equivalents,

What is claimed is:

1. A memory system comprising:
   a memory device comprising multiple memory dies; and
   a memory controller configured to control the memory device, wherein the memory controller is further configured to:
start an operation of writing multiple metadata units in a first metadata unit group in the multiple memory dies respectively;
determine whether or not there exists a request for an erase operation with regard to at least one of the multiple memory dies;
perform the erase operation, when the request for the erase operation exists after the start of the write operation, with regard to memory dies in a first memory die group, having a number of memory dies less than or equal to a first value, among the multiple memory dies; and
write at least one of the multiple metadata units in the first metadata unit group in the memory dies in the first memory die group respectively.

2. The memory system of claim 1, wherein the first value is determined on the basis of i) peak power consumed when performing an operation of erasing one memory block in the multiple memory dies and ii) peak power that the memory device is able to consume.

3. The memory system of claim 1,
wherein the memory controller is further configured to:
perform, after the start of the writing of each of multiple metadata units in the second metadata unit group in one of the multiple memory dies, the erase operation with regard to memory dies in a second memory die group, having a number of memory dies less than or equal to a second value, among the multiple memory dies; and
write at least one of multiple metadata units in the second metadata unit group in the memory dies in the second memory die group, and
wherein the memory dies in the first memory die group and the memory dies in the second memory die group are different from each other.

4. The memory system of claim 1, wherein the memory controller is further configured to determine, on the basis of a period, i) a time of the start of the operation of writing each of multiple metadata units in the first metadata unit group in one of the multiple memory dies and ii) a time of the start of the operation of writing each of multiple metadata units in the second metadata unit group in one of the multiple memory dies.

5. The memory system of claim 4, wherein the memory controller is further configured to write user data in at least one of the multiple memory dies between i) a time after the start of the operation of writing each of multiple metadata units in the first metadata unit group in one of the multiple memory dies and ii) a time before the start of the erase operation with regard to the memory dies in the first memory die group.

6. The memory system of claim 1, wherein the memory controller is configured to perform the erase operation with regard to the memory dies in the first memory die group by erasing only one of memory blocks in a memory die in the first memory die group.

7. A memory controller comprising:
a memory interface configured to communicate with a memory device comprising multiple memory dies; and
a control circuit configured to control the memory device, wherein the control circuit is further configured to:
start an operation of writing multiple metadata units in a first metadata unit group in the multiple memory dies respectively;
determine whether or not there exists a request for an erase operation with regard to at least one of the multiple memory dies;
perform the erase operation, when the request for the erase operation exists after the start of the write operation, with regard to memory dies in a first memory die group, having a number of memory dies less than or equal to a first value, among the multiple memory dies; and
write at least one of the multiple metadata units in the first metadata unit group in the memory dies in the first memory die group respectively.

8. The memory controller of claim 7, wherein the first value is determined on the basis of i) peak power consumed when performing an operation of erasing one memory block in the multiple memory dies and ii) peak power that the memory device is able to consume.

9. The memory controller of claim 7,
wherein the control circuit is further configured to:
perform, after the start of the writing of each of multiple metadata units in the second metadata unit group in one of the multiple memory dies, the erase operation with regard to memory dies in a second memory die group, having a number of memory dies less than or equal to a second value, among the multiple memory dies; and
write at least one of multiple metadata units in the second metadata unit group in the memory dies in the second memory die group, and
wherein the memory dies in the first memory die group and the memory dies in the second memory die group are different from each other.

10. The memory controller of claim 7, wherein the control circuit is further configured to determine, on the basis of a period, i) a time of the start of the operation of writing each of multiple metadata units in the first metadata unit group in one of the multiple memory dies and ii) a time of the start of the operation of writing each of multiple metadata units in the second metadata unit group in one of the multiple memory dies.

11. The memory controller of claim 10, wherein the control circuit is further configured to write user data in at least one of the multiple memory dies between i) a time after the start of the operation of writing each of multiple metadata units in the first metadata unit group in one of the multiple memory dies and ii) a time before the start of the erase operation with regard to the memory dies in the first memory die group.

12. The memory controller of claim 7, wherein the control circuit is configured to perform the erase operation with regard to the memory dies in the first memory die group by erasing only one of memory blocks in a memory die in the first memory die group.

13. A method for operating a memory controller configured to control a memory device comprising multiple memory dies, the method comprising:
writing multiple metadata units in a first metadata unit group in the multiple memory dies respectively; and
performing an erase operation, when there exists a request for the erase operation with regard to at least one of the multiple memory dies after the start of writing each of the multiple metadata units, with regard to memory dies in a first memory die group, having a number of memory dies less than or equal to a first value, among the multiple memory dies,
wherein at least one of the multiple metadata units in the first metadata unit group is written in the memory dies in the first memory die group respectively.

14. The method of claim 13,
further comprising performing, after start of the writing of each of multiple metadata units in the second metadata unit group in one of the multiple memory dies, the erase operation with regard to a second memory die group, having a number of memory dies less than or equal to a second value, among the multiple memory dies, wherein at least one of multiple metadata units in the second metadata unit group is written in memory dies in the second memory die group, and wherein the memory dies included in the first memory die group and the memory dies in the second memory die group are different from each other.

* * * * *